US006481008B1

(12) United States Patent
Chaiken et al.

(10) Patent No.: US 6,481,008 B1
(45) Date of Patent: Nov. 12, 2002

(54) INSTRUMENTATION AND OPTIMIZATION TOOLS FOR HETEROGENEOUS PROGRAMS

(75) Inventors: Ronnie I. Chaiken, Woodinville; Andrew J. Edwards, Redmond; John A. Lefor, Bellevue; Jiyang Liu, Issaquah; Ken B. Pierce, Bellevue; Amitabh Srivastava, Woodinville; Hoi H. Vo, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/343,298

(22) Filed: Jun. 30, 1999

(51) Int. Cl.$^7$ ............................................... G06F 9/45
(52) U.S. Cl. ..................... 717/158; 717/146; 717/130
(58) Field of Search ................................. 717/127, 130, 717/146–148, 151–153, 111, 113, 158, 162, 163

(56) References Cited

U.S. PATENT DOCUMENTS

| 5,559,884 | A | | 9/1996 | Davidson et al. | 713/187 |
|---|---|---|---|---|---|
| 5,659,754 | A | * | 8/1997 | Grove et al. | 717/9 |
| 5,664,191 | A | | 9/1997 | Davidson et al. | 709/100 |
| 5,790,858 | A | | 8/1998 | Vogel | 717/4 |
| 5,949,995 | A | * | 9/1999 | Freeman | 712/239 |
| 5,966,539 | A | * | 10/1999 | Srivastava | 717/4 |
| 5,999,737 | A | * | 12/1999 | Srivastava | 717/4 |
| 6,088,525 | A | * | 7/2000 | Peri | 717/4 |
| 6,186,677 | B1 | * | 2/2001 | Angel et al. | 717/4 |
| 6,308,320 | B1 | * | 10/2001 | Burch | 717/7 |
| 6,308,324 | B1 | * | 10/2001 | Roediger et al. | 717/9 |

OTHER PUBLICATIONS

Tavares & Couto, "An Automatic Programming Tool for Heterogeneous Multiprocessor Systems," IEEE Catalog No. 97TH8280, 1997, pp. 88–93.*

Tan & Siegel, "A Stochastic Model for Heterogeneous Computing and Its Application in Data Relocation Scheme Development," IEEE vol. 9, No. 11, Nov. 1998, pp. 1088–1101.*

(List continued on next page.)

Primary Examiner—Tuan Q. Dam
(74) Attorney, Agent, or Firm—Mark R. Hennings; Merchant & Gould (57) ABSTRACT

Pre-defined performance tools enable instrumentation and optimization of a heterogeneous program by modifying a platform-neutral intermediate representation (IR) of the program. The intermediate representation is hierarchy of base elements that correspond to instructions, code blocks, procedures and components within the program. Each base element exports an application program interface that provides for navigation, querying and modification of the corresponding element in the hierarchy. An application program interface for the entire intermediate representation includes the application program interfaces for the individual elements along with additional functionality. A user can request instrumentation and optimization of any level of the intermediate representation hierarchy and the performance tools perform the required modifications to the intermediate representation. When a modification requires inserting instructions, the performance tools add prologue and epilog code to connect the inserted instructions with the original intermediate representation instructions. When the intermediate representation instructions are translated into platform-specific instructions and executed, the modifications made to the intermediate representation provide the instrumentation and/or optimization of the heterogeneous program.

31 Claims, 6 Drawing Sheets

OTHER PUBLICATIONS

De Bosschere, K., et al., "Alto: A Link–Time Optimizer for the DEC Alpha.", *Technical Report TR–96–16*, (1996).

Goodwin, D.W., "Interprocedural Dataflow Analysis in an Executable Optimizer", Proceedings on SIGPLAN '97 Conference on Programming Language Design and Implementation, (1997).

Hastings, R., et al., "Purify: Fast Detection of Memory Leaks and Access Errors", Proceedings of Winter Usenix Conference, (Jan. 1992).

Larus, J., et al., "Rewriting Executable Files to Measure Profeam Behavior", *Software Practice and Experience*, 24(2), 197–218, (1994).

Larus, J.R., "EEL: Machine–Independent Executable Editing", *ACM SIGPLAN Notices*, 30(6), pp. 291–300, (Jun. 1995).

Lee, H., et al., "A Tool for Instrumenting Java Bytecodes", Proceedings of the 1997 USENIX Symposium pn Internet Technologies and Systems, (1997).

Romer, T., et al., "Instrumentation and Optimization of Win32/Intel Executables Using Etch", Proceedings of the USENIX Windows NT Workshop, (1997).

Srivastava, A., et al., "A Practical System for Intermodule Code Optimization at Link Time", *Journal of Programming Langauge*, 1(1), 1–18, (1993).

Srivastava, A., et al., "ATOM, A System for Buidling Customized Program Analysis Tools", *ACM SIGPLAN Notices*, 29(6), pp. 196–205, (Jun. 1994).

Wall, D.W., "Systems of Late Code Modification, in Code Genetatio–Concepts, Tools Technique", Robert Giegrich and Susan L. Graham, eds, 275–293, (1992).

* cited by examiner

INSTRUMENTATION AND OPTIMIZATION TOOLS FOR HETEROGENEOUS PROGRAMS

RELATED APPLICATIONS

The present application is related to U.S. Patent applications entitled "Translation and Transformation of Heterogeneous Programs" (application Ser. No. 09/343,805), "Cross Module Representation of Heterogeneous Programs" (application Ser. No. 09/343,287), "Application Program Interface for Transforming Heterogeneous Programs" (application Ser. No. 09/343,276), and "Shared Library Optimization for Heterogeneous Programs" (application Ser. No. 09/343,279), filed on the same day as the present application and assigned to the same assignee.

FIELD OF THE INVENTION

This invention relates generally to programming tools, and more particularly to tools for instrumenting and optimizing heterogeneous programs written for different computer architectures.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998, Microsoft Corporation, All Rights Reserved.

BACKGROUND OF THE INVENTION

In a new programming paradigm, a program is now a collection of components. Each component publishes an interface without exposing its inner details. Thus, a component can internally exist in any form: Intel x86 binary, Intel IA-64 binary, Visual Basic (VB) byte codes, Java class files, or any Virtual Machine (VM) binary. A heterogeneous program consists of components in different forms. Heterogeneous programs already exist in some environments: in the Microsoft Windows 32-bit environment, a Visual Basic program is compiled into VB byte codes that can call native-compiled functions in a separate dynamic linked library. Similarly Java class files can call native functions. Intel's IA-64 architecture allows IA-64 code to co-exist with x86 code.

To understand the behavior of a heterogeneous program, all its components, regardless of their form, have to be instrumented and analyzed in the same framework, otherwise, only partial information will be collected. It is important to note that systems that have been ported to several architectures are not sufficient to handle heterogeneous programs. For example, a system for VB byte codes that has been ported to x86, cannot provide a complete execution time analysis of a heterogeneous program consisting of VB byte codes and native x86 because each system operates in isolation on its own input.

Further, a heterogeneous program may consist of heterogeneous components. A heterogeneous component is a single component consisting of routines in different instruction sets. As the interface is well defined, components internally can use any instruction set. Each instruction set has its own advantages such as execution time, portability, and size.

All previous systems have been designed for homogeneous programs: conventional programs consisting of components in the same form. Some systems have been targeted to different architectures, but cannot work with heterogeneous programs. None of these systems can generate a heterogeneous component.

A large number of systems have been developed to help analyze and optimize homogeneous programs. The creation of "Pixie" by MIPS Computers Systems, Inc. in 1986 started a class of basic block counting tools by inserting predetermined sequence of instructions to record execution frequencies of basic blocks. "Epoxie" extended the technique by using relocations to eliminate dynamic translation overheads. David W. Wall. *Systems for late code modification*, in Code Generation—Concept, Tools Techniques, pp. 275–293, (Robert Giegrich and Susan L. Graham, eds, 1992). "QPT" further extended the technique by constructing spanning trees to reduce the number of basic blocks that are instrumented. James Larus and Thomas Ball, *Rewriting executable files to measure program behavior*, Software, Practice and Experience, vol. 24, no. 2, pp 197–218 (1994). "Purify" instruments memory references to detect out-of-bounds memory accesses and memory leaks. Reed Hastings and Bob Joyce, Purify: *Fast Detection of Memory Leaks and Access Errors*, Proceedings of Winter Usenix Conference, January 1992.

"OM" allowed general transformations to be applied to a binary by converting the binary to an intermediate representation that can be easily manipulated. Amitabh Srivastava and David Wall, *A Practical System for Intermodule Code Optimization at Link Time*, Journal of Programming Language, 1(1):1–18 (1993). OM has been implemented on MIPS, DEC Alpha and Intel x86 architectures. "EEL" uses a similar technique and provides an editing library for Sun SPARC architectures. James R. Larus and Eric Schnarr, EEL: *Machine-Independent Executable Editing*, Proceedings of SIGPLAN '95 Conference on Programming Language Design and Implementation (1995). "Alto" and "Spike" are optimizers for the DEC Alpha architectures. K. De Bosschere and S. Debray, Alto: *a Link-Time Optimizer for the DEC Alpha*. Technical Report TR-96-16, Computer Science Department, University of Arizona (1996). David W. Goodwin, *Interprocedural Dataflow Analysis in an Executable Optimizer*, Proceedings of SIGPLAN '97 Conference on Programming Language Design and Implementation (1997).

"ATOM" extended OM by providing a flexible instrumentation interface for the DEC Alpha and Intel x86 systems. Amitabh Srivastava and Alan Eustace, ATOM: *A System for Building Customized Program Analysis Tools*, Proceedings of SIGPLAN '94 Conference on Programming Language Design and Implementation (1994). However, ATOM does not allow modifications to a binary. "Etch" provided a similar system for x86 and "BIT" for Java byte codes. T. Romer, G. Voelker, D. Lee, A. Wolman, W. Wong, H. Levy, B. Chen, and B. Bershad, *Instrumentation and Optimization of Win32/Intel Executables Using Etch*, Proceedings of the USENIX Windows NT Workshop (1997). Han Lee and Benjamin Zorn, *BIT: A Tool for instrumenting Java bytecodes*. Proceedings of the 1997 USENIX Symposium on Internet Technologies and Systems (1997).

None of these systems work on heterogeneous programs. Some of them have been ported to multiple architecture but they provide only a partial view when applied to heterogeneous programs as each implementation operates on its input in isolation. Although OM builds a symbolic representation, the representation was primarily designed for applying arbitrary transformations and is not sufficient to handle heterogeneous programs. None of these systems can generate heterogeneous components. ATOM provides a flexible interface for instrumentation only.

To understand the behavior of a heterogeneous program, all its components, regardless of their form, have to be instrumented and analyzed in the same framework, otherwise, only partial information will be collected. It is important to note that systems that have been ported to several architectures are not sufficient to handle heterogeneous programs. For example, a system for VB byte codes that has been ported to x86, cannot provide a complete execution time analysis of a heterogeneous program consisting of VB byte codes and native x86 because each system operates in isolation on its own input. Similarly, optimizing a heterogeneous program can require rearranging instructions across platform boundaries but such whole program optimization is known to provide performance advantages when the program is executed.

Therefore, there is a need to represent a heterogeneous program and its heterogeneous components in a fashion that permits the behavior of the program to be evaluated across architectural boundaries and optimization to be performed on the entire program.

SUMMARY OF THE INVENTION

The above-mentioned shortcomings, disadvantages and problems are addressed by the present invention, which will be understood by reading and studying the following specification.

Pre-defined performance tools enable instrumentation and optimization of a heterogeneous program by modifying a platform-neutral intermediate representation (IR) of the program. The intermediate representation is hierarchy of base elements that correspond to instructions, code blocks, procedures and components within the program. Each base element exports an application program interface (API) that provides for navigation, querying and modification of the corresponding element in the hierarchy. An API for the entire IR includes the APIs for the individual elements along with additional functionality. A user can request instrumentation and optimization of any level of the IR hierarchy and the performance tools perform the required modifications to the intermediate representation. When a modification requires inserting instructions, the performance tools add prologue and epilog code to connect the inserted instructions with the original IR instructions. The API for the IR also provides a commit primitive that delays actual changes to the IR until the commit primitive is invoked. The IR hierarchy can be extended by creating new elements and associated APIs from the base elements in the hierarchy.

When the IR instructions are translated into platform-specific instructions and executed, the modifications made to the intermediate representation provide the instrumentation and/or optimization of the heterogeneous program. Because the architecture specific details are removed in the intermediate representation, instrumentations and optimizations can be perform across what were previously incompatible boundaries between components in a heterogeneous program. Moreover, the performance tools can be applied at any level in the hierarchy to provide scalability in the instrumentation and optimization of the program.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, an exemplary embodiment of an abstraction extension function is described. Finally, in the fifth section, a conclusion of the detailed description is provided.

Hardware and Operating Environment

Figure 1:
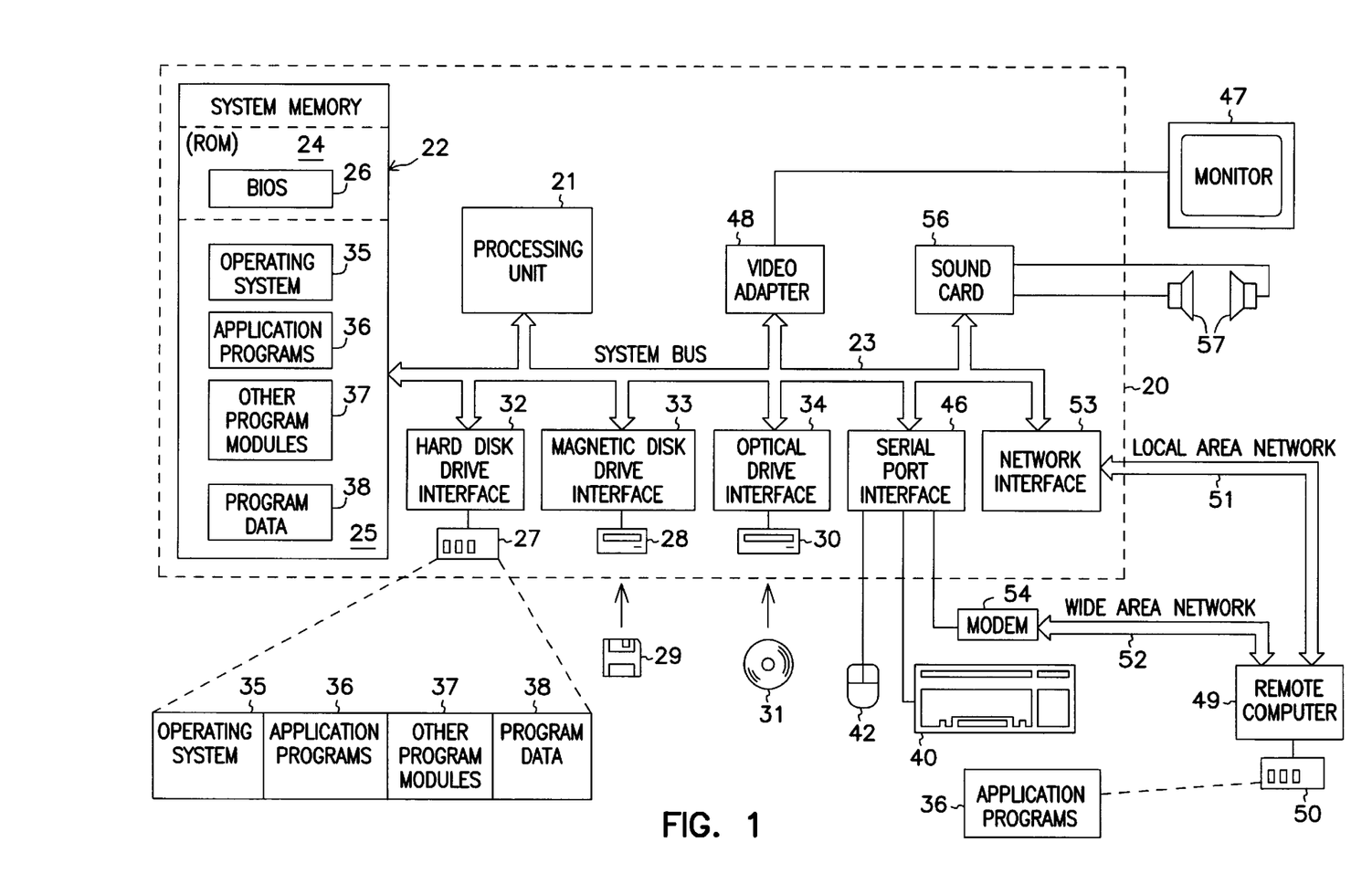
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
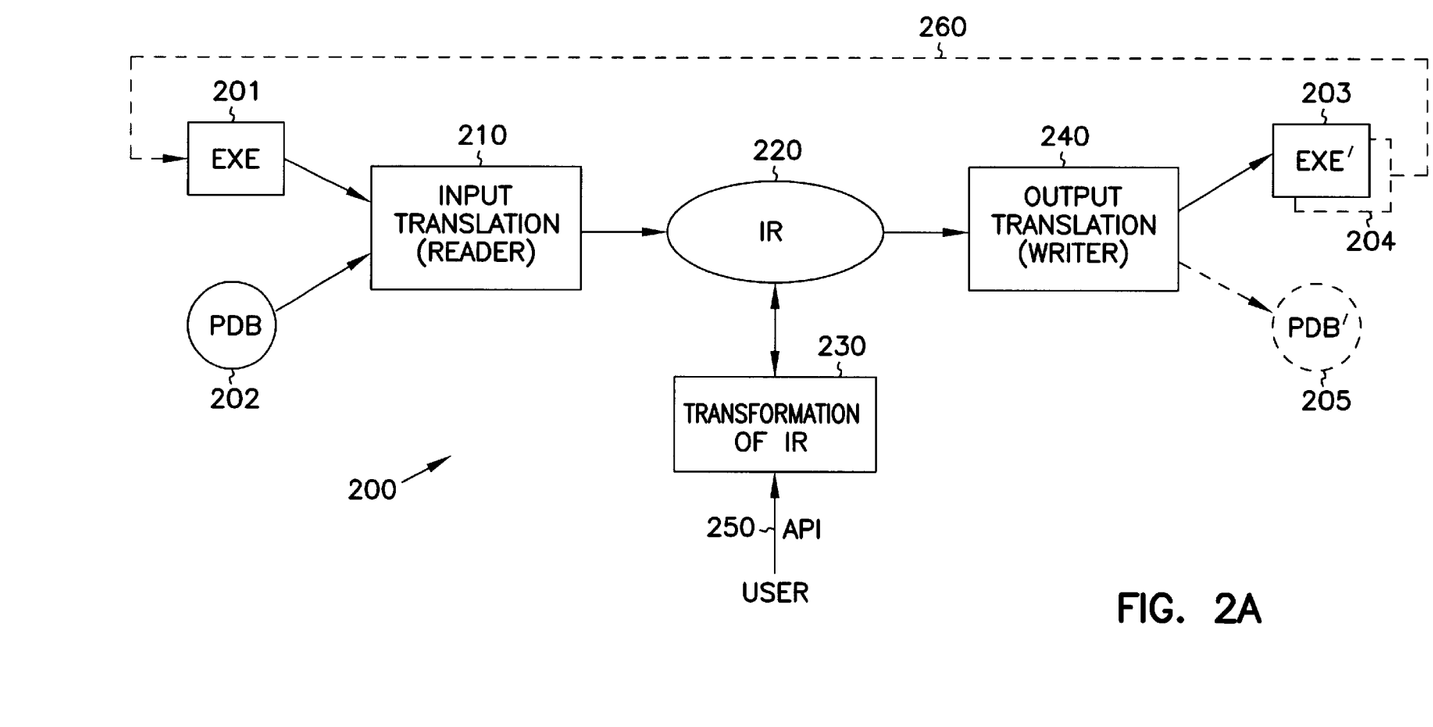
FIG. 2A is a diagram illustrating a system-level overview of an exemplary embodiment of the invention.

A system level overview of the operation of an exemplary embodiment of the invention is described by reference to FIGS. 2A–D. A heterogeneous program contains multiple executable components, such as main program code and shared libraries, written for different computer architectures (platforms) or programming languages. FIG. 2A shows a system 200 that translates and transforms components in a heterogeneous program. The system 200 comprises an input translator (reader) 210, a transformation module 230, and an output translator (writer) 240. All three modules work with a high-level abstraction of a heterogeneous program, referred to as an "intermediate representation" (IR) 220. The IR is a set of pseudo-instructions for a stack-based logical machine with an unlimited number of registers that represent the functionality of the heterogeneous program.

Figure 2B:
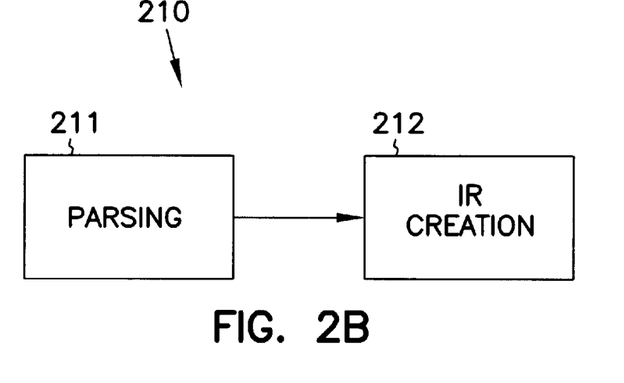
FIGS. 2B, 2C and 2D are diagrams illustrating additional details of the processes shown in FIG. 2A.
Figure 2C:
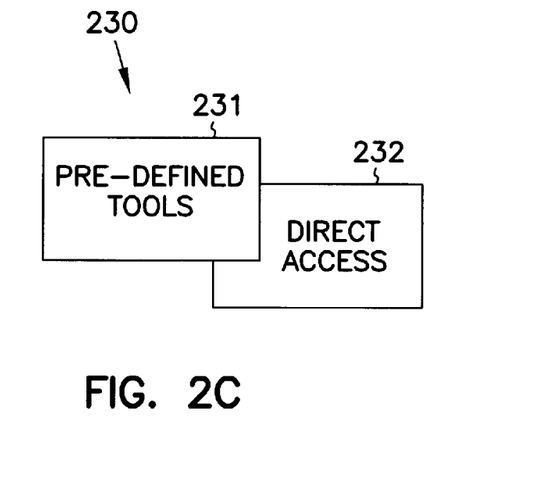

The reader 210 creates an IR 220 from an executable component (EXE) 201. The reader 210 is a two-stage process as shown in FIG. 2B. First, the executable 201 is parsed 211 into its basic blocks of code and data using information provided in a program database file (PDB) 202. As well-known in the art, a basic code block is defined as a code block having a single entry point and a single exit point. In an alternate embodiment, all the work performed by the parser 211 is input directly into the second stage of the reader 210, thus skipping the parsing process.

Once the code and data blocks are identified, an IR creation process 212 evaluates each platform-dependent instruction on a block-by-block basis. There are very large set of common instructions regardless of architecture, i.e., move, store, add, etc., that can be represented by a single platform-neutral IR instruction. For RISC (reduced instruction set computer) architectures, most, if not all, instructions can be easily translated into a single platform-neutral IR instruction. On the other hand, CISC (complex instruction set computer) architectures, such as the Intel x86 family, contain complex instructions that provide the function of multiple instructions. In one exemplary embodiment, the platform-dependent instructions that have a single platform-neutral IR instruction counterpart are translated into that platform-neutral instruction, while complex instructions are replicated as-is within the IR through an extended version of the basic IR instruction. A replicated complex instruction is marked with a signature that denotes its architecture. The output translator 240 recognizes a signed complex instruction and processes it as described further below. In an alternate embodiment, a complex instruction is represented by a set of platform-neutral IR instructions that perform the equivalent function.

Figure 3:
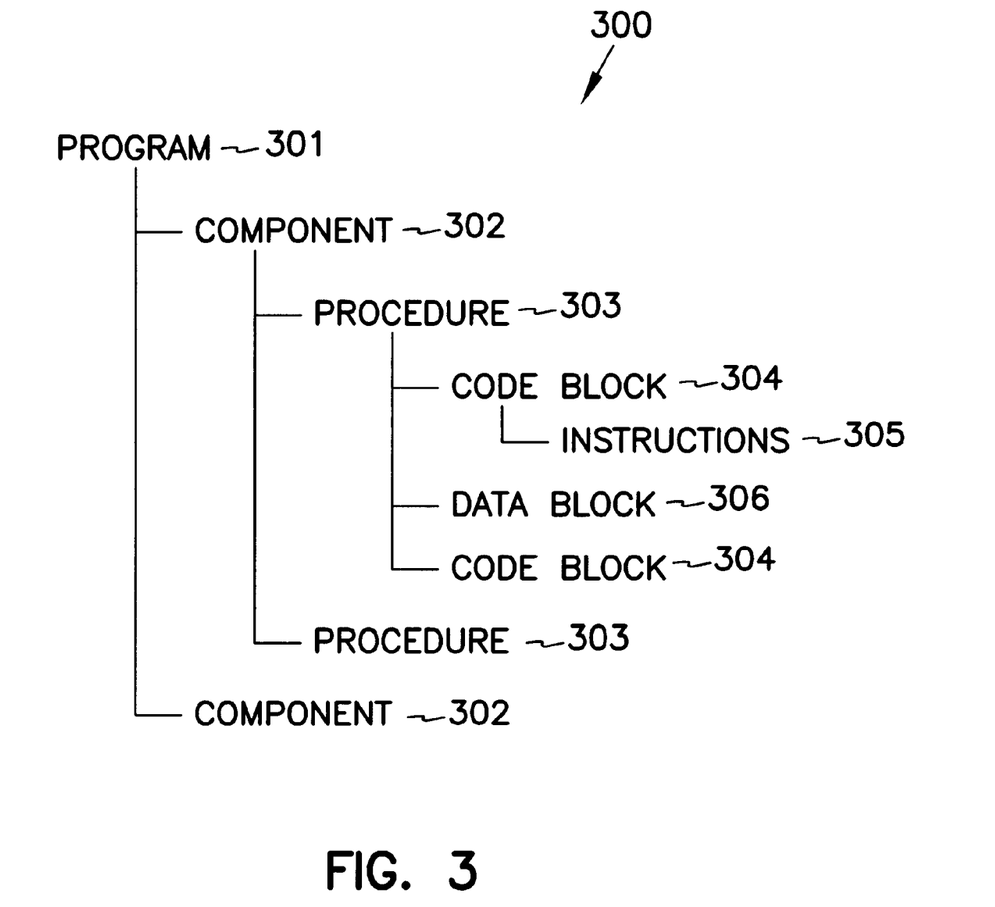
FIG. 3 is a diagram of an intermediate representation hierarchy used by the exemplary embodiment of FIG. 2A.

After the instructions in the code blocks have been translated, the IR creation process 212 creates a logical hierarchical view of the executable 201 as illustrated in FIG. 3. All architectures share the basic concepts of instructions 305, code blocks 304, data blocks 306, components 302, and procedures 303, so the IR hierarchy 300 enables the user to understand the structure of the intermediate representation of a heterogeneous program 301. The code blocks are logically connected as specified in the EXE file 201 so that the blocks can be more easily manipulated during the transformation process 230. Procedures are determined by following the logical connections using information provided in the PDB file 202. Procedures are collected together to create the program components. Little or no optimization of the program is performed by the creation process 212 since it is desirable that the intermediate representation be as close to what the programmer originally wrote as possible.

However, tracing the logical connections to determine the procedures can result in more procedures being created than originally coded by the programmer. Therefore, the creation process 212 annotates, or "decorates," the hierarchy 300 with the user names supplied in the symbol table for the EXE 201. The annotations enable the user to understand how the IR control flows and how the elements of the IR hierarchy correspond to the procedures and the components in the original code so the appropriate transformations can be applied to the IR. The annotations are maintained in data structures for the procedures during the transformation process and output by the output translator 240.

At the end of the creation of the IR hierarchy, all instructions are represented in the hierarchy as IR instructions within code blocks so that there is no differentiation between code written for one platform and code written for a second platform. The creation of the IR and an exemplary embodiment of the IR hierarchy are described in detail in the related "Translation and Transformation" patent application.

Once the intermediate representation is complete, the user is allowed to manipulate the code and data (illustrated by the IR transformation module 230) through an application program interface (API) 250. The exemplary embodiment of the system 200 provides some pre-defined tools 231 (FIG. 2C) used to instrument and optimize the IR that are guaranteed to be safe in that the tools will evaluate a change requested by the user and only manipulate the code in an appropriate manner. The API 250 also permits the user direct access 232 to the IR to navigate through the IR and to make changes, such as moving blocks between procedures, modifying blocks, rearranging the logical connections between blocks, and changing the platform-specific instruction set for a code block. Exemplary embodiments of the tools 231 are described in the next section. The API 250 is described in detail in the related "Application Program Interface" patent application.

By instrumenting the IR using the tools 231, the user can now watch the interrelationship between the various components of a heterogeneous program and determine if a block of code contained in one component is heavily used by another component, and therefore that block of code should be moved out of the first component and placed into the second component to speed up execution. This process is described in detail in the related "Shared Library Optimization" patent application. Alternately, the user may decide to copy, instead of move, the code into the second component, a process referred to in the art as "code replication." A common optimization technique called "inlining" utilizes code replication.

Figure 2D:
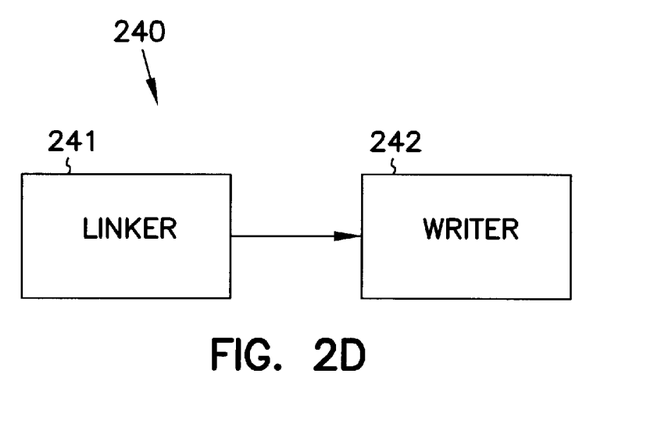

The transformed IR is now input into the output translator 240. The output translator 240 operates on the IR in two phases as shown in FIG. 2D: a linker phase 241 that resolves the logical connections into absolute addresses in an address space for a modified version of the executable, and a writer phase 242 that assembles the IR into the modified version of the executable (EXE') 203. The blocks in the executable 203 can be emitted by the writer 242 for their original platform, or can be emitted for a different platform.

The linker 241 must maintain the semantics of the code of the hierarchy when resolving the addresses, i.e., preserve the logical connections between blocks and the location of referenced data. The linker 241 determines the size of each code block based on the length of each instruction in the block. The linker 241 is also responsible for adding whenever prologue and epilogue code necessary to "glue" together contiguous blocks that will be assembled into different platform-dependent instructions. As part of the address resolution, the linker 241 also can perform limited code modification or optimization. For example, assume that prior to the transformation process 230, there was a jump between two code blocks, but those blocks are now contiguous. In this case, the linker 241 removes the now-unnecessary jump and lets the logic flow fall through to the second block. Because the hierarchy extends down to the instruction level and is consistent regardless of the manipulation performed by the user, the linker 241 has more knowledge of the placement of instructions than did the programmer. Thus, in architectures in which instructions have both a long and short form depending on the location they are addressing, the linker 241 chooses the appropriate instruction size, which can be a better choice than that originally made by the programmer.

The writer 242 assembles each IR instruction into its platform-dependent counterpart based on the architecture specified in the code block. In an exemplary embodiment in which complex instructions are replaced in the IR, if the complex instruction is being written to the same platform, the writer 242 merely emits the instruction. If the complex instruction is designated to be translated into a different architecture, the writer 242 creates the appropriate set of platform-specific instructions to perform the same function as the original, complex instruction.

As part of the EXE' 203, the writer 242 creates an emitted block information data structure containing the annotations created by the reader process 210 for each block in the executable. This allows the EXE' 203 to be iterated through the entire process 200 as many times as desired (represented by phantom arrow 260 and described in the related "Translation and Transformation" patent application ), while enabling the user to distinguish the original procedures from those added in a previous iteration as described further below. In an alternate embodiment, the emitted block information is combined with the PDB file 202 to create a new version of the program database file (PDB') 205 (shown in phantom). The output translation process 240 is described in detail in the related "Cross Module Representation" patent application.

In an alternate exemplary embodiment of the translation and transformation system 200 not illustrated, the IR containing the absolute addresses assigned by the linker 241 is used as input into the IR creation process 212 for further iteration through the system 200. One of skill in the art will immediately appreciate that much of the work performed by the creation process 212 as described above can be skipped when iterating the modified IR through the system 200. This embodiment allows the user to transform a heterogeneous program in stages rather than having to make all the changes in a single pass through the system 200.

The system level overview of the operation of an exemplary embodiment of the invention has been described in this section of the detailed description. A translation and transformation system translates a binary component into an intermediate representation, provides an application program interface through which a user can transform the intermediate representation, and translates the intermediate representation as transformed by the user into a modified version of the binary. While the invention is not limited to any particular arrangement of modules, for sake of clarity exemplary set of modules has been described. One of skill in the art will readily recognize that the functions attributed to the modules described in this section can be assigned to different modules without exceeding the scope of the invention. Furthermore, although the translation and transformation of only one input component (EXE 201) has been illustrated and described above, the system can take multiple components, and accompanying PDB files, as input.

Methods of Exemplary Embodiments of the Invention

Figure 4A:
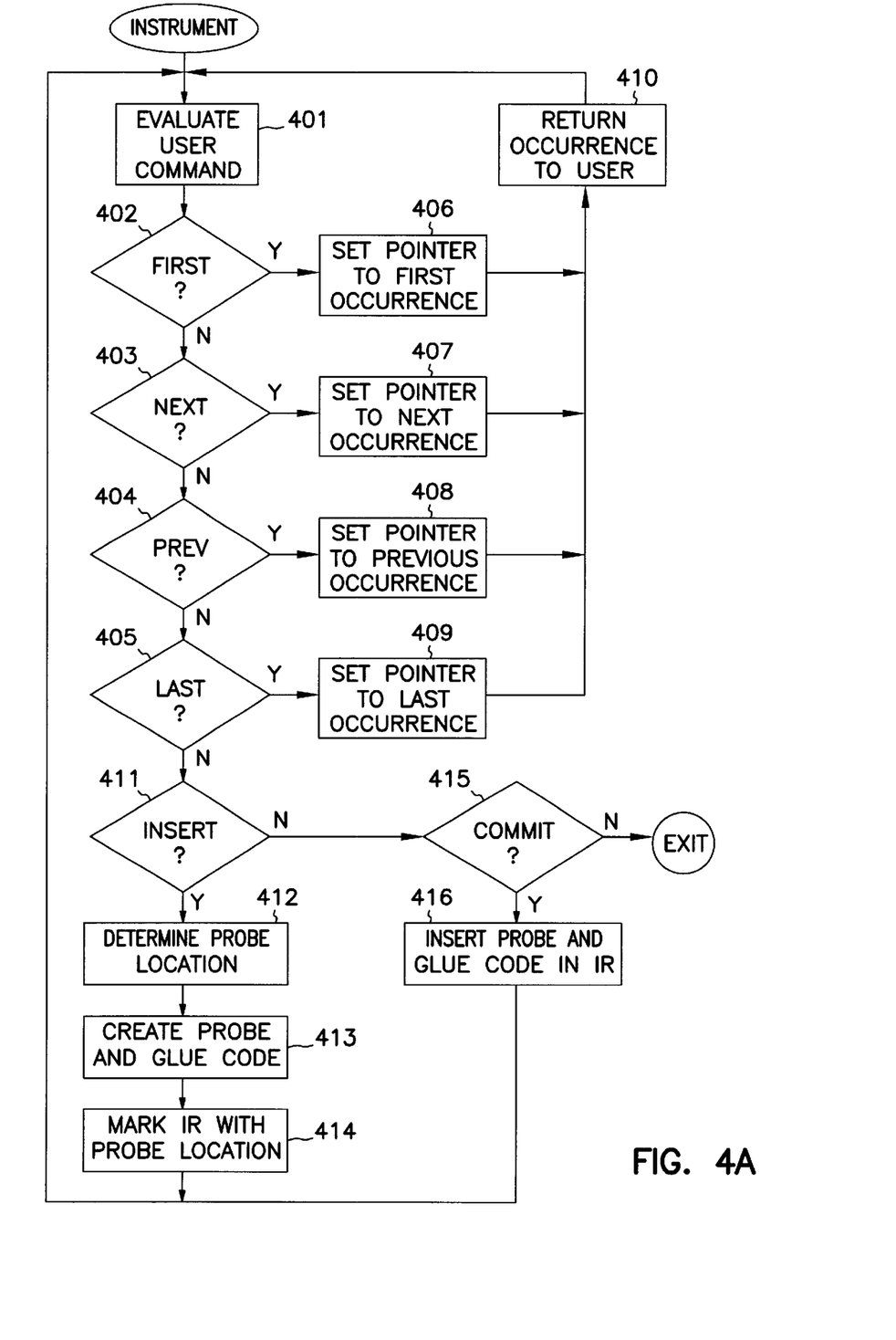
FIG. 4A is a flowchart of an instrumentation method to be performed on an intermediate representation of a program by a computer according to an exemplary embodiment of the invention.
Figure 4B:
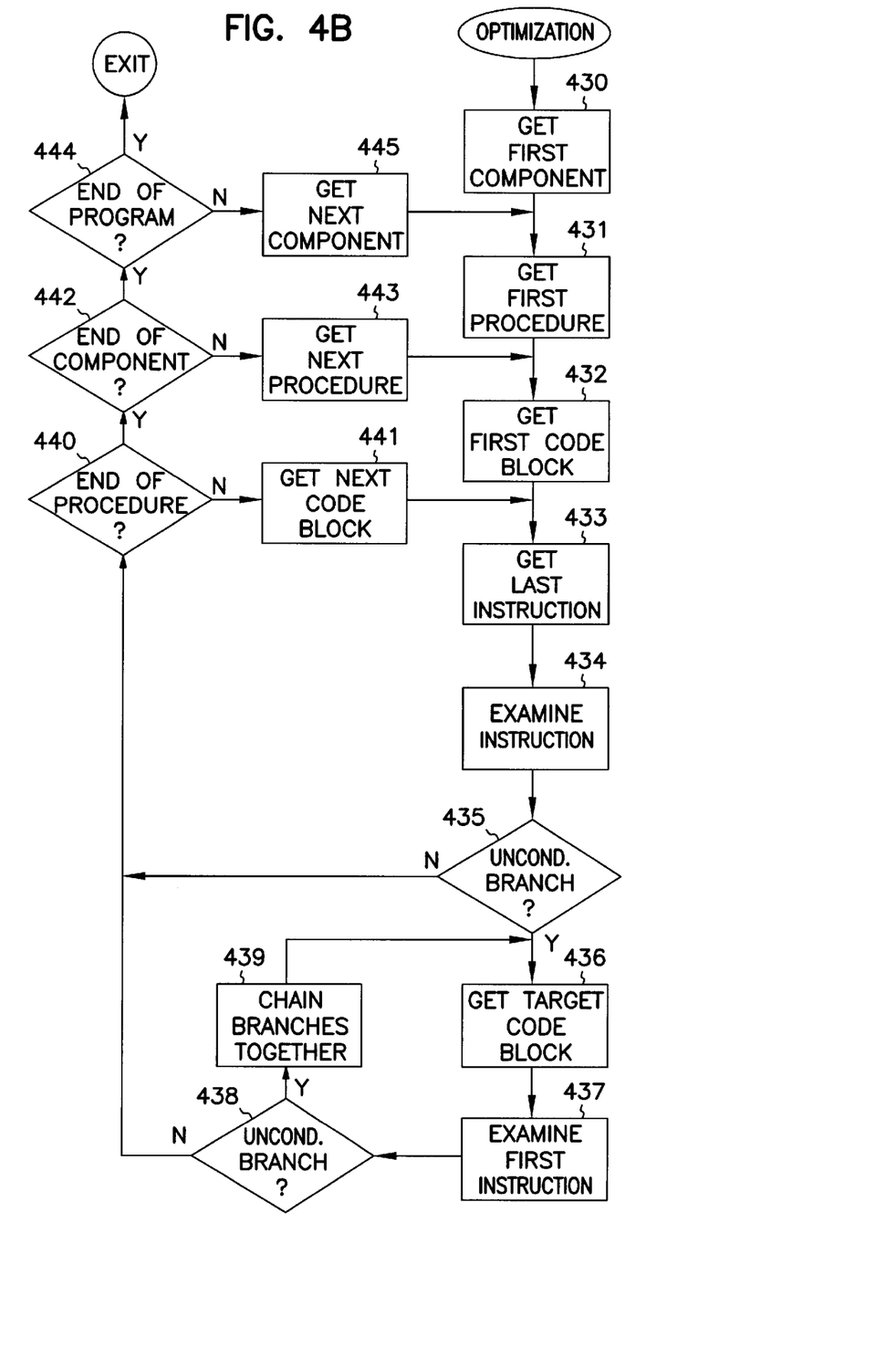
FIG. 4B is a flowchart of an optimization method to be performed on an intermediate representation of a program by a computer according to an exemplary embodiment of the invention.

In the previous section, a system level overview of the operations of exemplary embodiments of the invention was described. In this section, the particular methods performed by a computer executing exemplary embodiments of the invention are described by reference to a series of flowcharts. The methods to be performed constitute computer programs made up of computer-executable instructions. Describing the methods by reference to a flowchart enables one skilled in the art to develop such programs including such instructions to carry out the methods on a suitable computer (the processor of the computer executing the instructions from computer-readable media). FIGS. 4A and 4B illustrate the acts to be performed by a computer executing exemplary embodiments of the pre-defined performance tools 231 (FIG. 2C) for application to an IR hierarchy 220 representing at least one component in heterogeneous program.

The pre-defined performance tools 231 are divided into two broad classes: instrumentation tools that provide information to the tool user about the program, and optimization tools that automatically improve the performance of the program at the direction of the user. A method performed by an exemplary embodiment of an instrumentation tool that inserts a "probe" (instrumentation code) into the IR 220 is illustrated in FIG. 4A. A method performed by an exemplary embodiment of a optimization tool that chains together unconditional branches of a program is illustrated in FIG. 4B.

Each element of the IR hierarchy 220 exports an API for navigation, query and modification and these APIs underlay the global API 250 shown in FIG. 2A. A user accesses the performance tools 231 through the API 250, and the performance tools 231, in turn, call the appropriate element APIs to instrument and optimize the IR 220. The navigation functions enable the user to obtain the first, last, previous, or next occurrence of any of the IR hierarchical elements in an iterative fashion so the user can easily observe the control flow through a program. The query function returns the properties of a particular hierarchical element. The modification function permits changes to be applied at any level of the IR hierarchy. The details of the API 250 and the underlying element API functions are provided in the related application titled "Application Program Interface for Transforming Heterogeneous Programs." As described below, the exemplary methods for the pre-defined performance tools 231 perform the actual modification to the IR based on the user's direction. The user is also able to directly modify the IR through the API 250 as described in the related "Application Program Interface" application.

The exemplary method for an instrumentation tool as illustrated in FIG. 4A iterates through the IR and inserts probes at the component, the procedure, the block and instruction levels at the direction of a user. The user invokes one of the API instrumentation commands, which causes the instrumentation tool to evaluate the command (block 401). If the command is a navigation command, i.e., first, next, previous, or last (blocks 402, 403 and 404, respectively), the instrumentation tool positions a pointer to the appropriate occurrence of the hierarchical element type specified in the command (blocks 406–409). The occurrence is returned to the user (block 410). The user can evaluate the characteristics of the returned element using the query functions of the API (not shown).

If the user command is to insert a probe in the IR (block 411), the instrumentation tool determines the location within the IR for the probe (block 412). In one exemplary embodiment, the user dictates the IR location at which the probe should be inserted by specifying whether the probe should be inserted before or after the current occurrence of an element type. In an alternate exemplary embodiment, the instrumentation tool itself determines an appropriate location or locations based on the type of statistics the user requests. The instrumentation tool uses the API navigation commands shown in blocks 402–405 to move to the insertion point for the probe.

The following code illustrates a simple instrumentation pass over all function heads in a component. A call to a user-supplied procedure "ProcTrace" is inserted in front of all functions whose name begins with the string "MyProc" through an "AddCall" API primitive. ProcTrace is defined in a user library "Trace.Dll" library and takes one character argument. The prototype for ProcTrace is defined using "CreateProto." The changes are committed after all the function heads have been instrumented and the image is then emitted as platform-specific code by the output translator 240 (FIG. 2A)

```
void InstrumentProcedures(Vprog *vprog)
{
    // Create the prototype
    VProtoList *pProtoList=VProtoList::CreateProtoList(
        );
    VProto *pProto=pProtoList->CreateProto(pComp,
        "Trace.Dll", "ProcTrace(char*)");
    for (pComp=vprog->FirstComp( ); pComp; pComp=
        pComp->Next( ))
    {
        for (VProc *pProc=pComp->FirstProc( );
            pProc!=NULL;
            pProc=pProc->Next( ))
        {
            // Instrument the beginning of the appropriate
               procedures
            if (strncmp(pProc->Name( ), "MyProc", 6)=0
            {
                pProto->AddCall(pProc, BEFORE, pProc-
                    >Name( ));
            }
        }
    }
    // Commit the changes
    pProtoList->Commit( );
    // Write out the image
    pComp->Write( );
}
```

U.S. Pat. No. 5,790,858, titled "Method and System for Selecting Instrumentation Points in a Computer Program" and assigned to the assignee of the present invention, also describes a process suitable for use by the instrumentation tool in determining probe locations.

Once the location is determined, the instrumentation tools creates code for the probe using information supplied by the user (block 413). Such information includes the type of statistics to collect, the frequency of such collection, and a user-supplied routine name to which the probe code will passes the statistics for evaluation. At block 413, the instrumentation tool also creates the prologue and epilogue glue code necessary to connect the probe code to the IR instructions that occur before and after the probe code. In the exemplary embodiment, the probe and glue code are not inserted into the IR at this time; instead the modification is represented in the memory space of the IR by a logical pointer placed at the insertion location (block 414). The probe and glue code are actually inserted into the IR (block 415) when the user invokes a commit command (block 416) for the probe, which uses the modification calls of the API to change the IR. A user typically makes multiple passes over the program to decide which points in the program to instrument and what arguments to input. Delaying the insertion of the probe through the commit primitive enables the user to iterate over the original code in the IR without having to iterate over the inserted probe code as well. In an alternate embodiment in which the API 250 does not provide a commit primitive, the probe and glue code is inserted into the IR when it is created.

Once the user has evaluated the program flow using the statistics provided by the instrumentation tool as shown in FIG. 4A, the user can determine what optimizations are appropriate for the program. Such optimizations include rearranging code blocks to group together those blocks frequently accessed together ("page optimization"), replicating code from one block into another block ("code inlining"), relocating code from one block to another block, and removing unused code blocks from the control flow of the program ("branch chaining"). A method for performing page optimization that is suitable for adaptation to an IR is disclosed in U.S. Pat. No. 5,664,191, titled "Method and System for Improving the Locality of Memory References during Execution of a Computer Program" and assigned to the assignee of the present invention. Code relocation is discussed in the related "Shared Library Optimization" application. A method for branch chaining is illustrated in FIG. 4B. A wide range of optimization tools that work with the IR, such as a peephole optimizer (a tool that recognizes certain patterns of the code bytes and replaces them with faster sequences of code instructions), binary translators (convert code bytes from one platform to another without the use or recompilation of source codes) or instrumentation tools such as basic block counting, hierarchical profiling, code coverage and cache simulators, can be easily built by one of skill in the art after reviewing the provided examples.

FIG. 4B illustrates an exemplary embodiment of an optimizing tool that performs branch chaining. The navigation functions described above are used to iterate through the IR of the program to be optimized. The last instruction in each code block is examined starting with the first code block in the first procedure in the first component in the program (blocks 430–434). If the instruction is an unconditional branch, the optimization tool gets the code block that is the target of the unconditional branch (block 436). If the first instruction of the target code block is also an unconditional branch (blocks 437 and 438), the branches are chained together (block 439) so that the control flow skips the middle target block when the program is executed. The loop represented by blocks 426–429 repeats until the first instruction in a target block is not an unconditional branch instruction.

At that point, the optimization tool determines if the current code block is the last code block in the current procedure (block 440). If not, the next code block is obtained for processing (block 441). If the current code block is the last code block in the procedure, the optimization tool determines if the current procedure is the last procedure in the current component (block 442). If not, the next procedure is obtained for processing (block 443). If the current procedure is the last procedure for the current component, the optimization tool determines if the current component is the last component in the program (block 444). If not, the next component is obtained for processing (block 445). If the current component is the last component in the program, the branch chaining optimization is complete.

The optimization tool illustrated in FIG. 4B immediately modifies the IR at block 439. If the user wants the modifications to be made to the IR at different times, an API commit primitive similar to that described above can be used to effect the change only when directed by the user.

As described in this section, instrumentation and optimization can be performed at any or multiple levels in the IR hierarchy, which provides for the scalability of both functions instead of being limiting the application of instrumentation and optimization tools to a particular granularity of a program. Tools which need to work on individual instructions, the lowest level of the IR, can be used efficiently because the IR instructions are mapped approximately one-to-one to the original platform instructions. The higher levels in the hierarchy permit the building and use of tools that operate on collections of instructions, similar to well-known compiler optimization routines. Since all interactions are through the API 250, the user does not need to understand the platform-specific details of the program and instrumentation and optimization tools can be applied at all levels of the IR hierarchy in a neutral manner.

The invention is not limited to only the pre-defined instrumentation and optimization tools described in this section. Additional types of performance tools can be applied to the IR hierarchy as will be readily apparent to one of skill in the art. Furthermore, the API for the IR hierarchy enables custom tools to be developed and applied to the IR as required by the user. Exemplary embodiments of one such custom tool is described in the next section.

Abstraction Extensions

As described above, the IR elements form a basic set of higher-level abstractions with an API for each element type that enables navigation, querying and modification of the corresponding element. The API 250 (FIG. 2) also includes instruction primitives for memory addresses, branches, register contents that allows users to write code in an architecture independent way. Intel's x86 architecture has addressing modes for referencing memory while a RISC architecture, such as the DEC Alpha, have a simple base register with a displacement. By using an "effective address" primitive provided by the API for an instruction, the user is able to ignore the architecture specific details while the API permits the tools to determine the memory address that is being referenced.

Abstractions extensions can be easily built using the base abstractions. The API 250 includes an instrumentation "extension" interface that enables the addition of APIs for extended IR abstractions. For example, an abstraction for an input file can be built when necessary to deal with input specific details. The API exported by this abstraction would allow access to header information and format specific details of the input file. Because each extended level abstraction exports its own API, the extension interface allows a user to add new abstractions as needed.

In addition to the base abstractions of the IR hierarchy, the API 250 for the instrumentation and optimization tools includes a set of extended abstractions for control flow graphs (CFG), data flow graphs (DFG), call graphs and interprocedural flow graphs. These graphs provide alternative ways to view the program being instrumented and/or optimized. Because the extended abstractions export their own API, they can be used by an instrumentation or optimization tool in the same fashion as the base abstractions.

For example, the following code block illustrates a CFG abstraction and associated API that is used by an edge profiler instrumentation tool "Eprof"to count the number of times each edge is executed in a program. The basic IR hierarchy for the program is passed in as "VProg." The first two "for" loops iterate over the components and procedures as described above in conjunction with FIG. 4A. As each procedure is found, a CFG abstraction is created that consists of the procedure's nodes and the outgoing edges. The CFG abstraction also contains an API for defining and solving data flow equations. The next two "for" loops iterate over the nodes and edges of each CFG abstraction. Each edge in a procedure is instrumented with a call to a user supplied procedure "PrintEdge" using an "AddCall" API primitive. PrintEdge is defined in the user's library "eprint.dll" and it takes one integer argument. The prototype for PrintEdge is defined using "CreateProto." The changes are committed after each procedure has been instrumented. Note that this edge profiling code is applicable to components originally written for different architectures since it works within the IR hierarchy.

```
void Eprof(Vprog *vprog)
{
    int cnt=0;
    VProtoList protoList;
    for (VCompIter vci=vprog.List( ).Begin( ); !vci.Done(
        ); vci.Next( )){
    Vproto  *pProto=protoList.CreateProto(vci.Curr( ),
        "eprint.dll",
"PrintEdge(int)");
    for (VProcIter vpi=vci.First( ); !vpi.Done( ); vpi.Next(
        ) {
        CflowGrph grph(NULL, NULL);
    grph.InitGrph(ci, pi);
        grph.BuildCFG( );
        for (VNodeIter vni=grph.First( ); !vni.Done( );
            vni.Next( )){
            for (VEdgeIter vei=vni.FirstFlowSucc( );
                !vei.Done( );
vei.Next( )){
    pProto->AddCall(vei, BEFORE, cnt++);
        }
        protoList.Commit( );
        grph.Commit( );
    }
    ci.Curr( ).Write( );
    }
}
```

CONCLUSION

Pre-defined performance tools that modify an intermediate representation of a heterogeneous program have been described. The intermediate representation is hierarchy of platform-neutral elements that correspond to instructions, code blocks, procedures and components within the program. Each element exports an application program interface that provides for navigation, querying and modification of the element in the hierarchy. Because the architecture specific details are removed in the intermediate representation, the performance tools are able to perform instrumentation and/or optimizations across what were previously incompatible boundaries between components in a heterogeneous program. Moreover, the performance tools can be applied at any level in the hierarchy to provide scalability in the instrumentation and optimization of the program. Extensions to the base elements can be defined to present a different view of the hierarchy to the performance tools.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate all types of instrumentation and optimization tools are suitable for application to the intermediate representation since there is no restriction on the level of the hierarchy to be instrumented or optimized. Furthermore, those of ordinary skill within the art will appreciate that the different views of the hierarchy provided by the extension elements enable the easy adaptation of existing performance tools to work on heterogeneous programs.

The terminology used in this application with respect to is meant to include all of these architectural environments. Therefore, it is manifestly intended that this invention be limited only by the following claims and equivalents thereof.

We claim:

1. A computerized method for instrumenting a heterogeneous program comprising:
   providing an intermediate representation of the heterogeneous program, wherein the heterogeneous program comprises routines in different instruction sets;
   providing a set of navigation commands for each one of a plurality of elements in the intermediate representation of the heterogeneous program;
   providing a set of modification commands for each one of the plurality of elements in the intermediate representation;
   creating instrumentation code to be inserted into the intermediate representation;
   determining an element location for the instrumentation code within the intermediate representation;
   navigating to the location using the navigating commands; and
   inserting the instrumentation code at the location using the modification commands to collect statistics when the heterogeneous program is executed.

2. The method of claim 1, wherein the plurality of elements comprise a set of base elements including a component element, a procedure element, a code block element, and an instruction element.

3. The method of claim 2, wherein the plurality of elements in the intermediate representation further comprise at least one extension element derived from a base element.

4. The method of claim 1, further comprising providing a commit command and wherein inserting the instrumentation code occurs when the commit command is invoked.

5. The method of claim 1, wherein determining the element location is based on user input.

6. The method of claim 1, wherein determining the element location is based on a type of instrumentation requested by a user.

7. The method of claim 1, wherein the instrumentation code comprises probe instructions to gather the statistics and interface instructions to connect the probe instructions to elements in the intermediate representation.

8. The method of claim 7, wherein the probe instructions comprise a call to a user-supplied routine to process the statistics.

9. A computerized method for optimizing a heterogeneous program comprising:
   providing an intermediate representation of the heterogeneous program, wherein the heterogeneous program comprises components in different instruction sets;
   providing a set of navigation commands for each one of a plurality of elements in the intermediate representation of the heterogeneous program;
   providing a set of modification commands for each one of the plurality of elements in the intermediate representation;
   navigating to an element location within the intermediate representation using the navigation commands; and
   modifying the intermediate representation at the location using the modification commands to optimize execution of the heterogeneous program.

10. The method of claim 9, wherein the plurality of elements comprise a set of base elements including a component element, a procedure element, a code block element, and an instruction element.

11. The method of claim 10, wherein the plurality of elements in the intermediate representation further comprise at least one extension element derived from a base element.

12. The method of claim 10, wherein modifying the intermediate representation comprises moving at least one instruction element from one of the code block elements to another code block element.

13. The method of claim 10, wherein modifying the intermediate representation comprises replicating at least one instruction element in one of the code block elements in another code block element.

14. The method of claim 10, wherein modifying the intermediate representation comprises moving at least one code block element from one of the component elements to another component element.

15. The method of claim 10, wherein modifying the intermediate representation comprises grouping together a plurality of code block elements that were previously separated within the intermediate representation.

16. The method of claim 10, wherein modifying the intermediate representation comprises:
   finding an instruction element that represents an unconditional branch instruction;
   determining which code block element is a target for the unconditional branch instruction;
   evaluating a first instruction element in the target code block element; and
   chaining together the unconditional branch instruction with the first instruction element in the target code block element if the first instruction element represents an unconditional branch instruction.

17. The method of claim 9, further comprising providing a commit command and wherein modifying the intermediate representation occurs when the commit command is invoked.

18. A computer-readable medium having computer-executable instructions to cause a computer to perform a method comprising:
   providing an intermediate representation of the heterogeneous program, wherein the heterogeneous program comprises components in different instruction sets;
   locating a position in the intermediate representation of the heterogeneous program through an application programming interface exported by the intermediate representation; and
   modifying the intermediate representation at the location through the application programming interface.

19. The computer-readable medium of claim 18, wherein intermediate representation comprises a plurality of elements and the application program interface comprises an application program interface for each one of the plurality of elements.

20. The computer-readable medium of claim 18, wherein modifying the intermediate representation comprises inserting an instrumentation probe into the intermediate representation.

21. The computer-readable medium of claim 18, wherein modifying the intermediate representation comprises optimizing a portion of the intermediate representation.

22. A computerized system, comprising:
   a processing unit;
   a system memory coupled to the processing unit through a system bus;
   a computer-readable medium couple to the processing unit through a system bus;
   a heterogeneous program for execution from the computer-readable medium by the processing unit; and
   pre-defined performance tools executed from the computer-readable medium by the processing unit, wherein the pre-defined performance tools cause the processing unit to modify an intermediate representation of the heterogeneous program, wherein the heterogeneous program comprises components in different instruction sets.

23. The computerized system of claim 22, further comprising:

an application program interface associated with the intermediate representation, wherein the application program interface is executed from the computer-readable medium by the processing unit and coupled to the pre-defined performance tools such that user input received by the application program interface instructs the pre-defined performance tools to cause the processing unit to modify the intermediate representation.

24. The computerized system of claim 22, wherein the pre-defined performance tools comprise an instrumentation tool that causes the processing unit to insert instrumentation code into the intermediate representation to gather statistics when the heterogeneous program is executed by the processing unit.

25. The computerized system of claim 22, wherein the pre-defined performance tools comprise an optimization tool that causes the processing unit to modify the intermediate representation to optimize the heterogeneous program when it is executed by the processing unit.

26. A computer-readable medium having computer-executable instructions stored thereon to instrument a heterogeneous program comprising:

creating an intermediate representation for instrumentation instructions that gather statistics on the heterogeneous program, wherein the heterogeneous program comprises routines in different instruction sets;

locating a point in the intermediate representation for the heterogeneous program at which to gather the statistics; and inserting the intermediate representation of the instrumentation instructions code at the point.

27. The computer-readable medium of claim 26, wherein the point is located based on user input.

28. The computer-readable medium of claim 26, wherein the point is located to be optimal for the statistics gathered.

29. The computer-readable medium of claim 26, wherein the instrumentation instructions comprise a call to a user-supplied routine to process the statistics.

30. A computer-readable medium having computer-executable instructions stored thereon for optimizing a heterogeneous program, wherein the heterogeneous program comprises components in different instruction sets, comprising:

determining an optimization to be applied to the heterogeneous program; and modifying an intermediate representation of the heterogeneous program to accomplish the optimization.

31. The computer-readable medium of claim 30, wherein the optimization is determined by a user.

* * * * *